July 22, 1969          R. H. SMITH          3,456,824
DEEP SEA REFUSE DISPOSAL
Original Filed Feb. 20, 1967          2 Sheets-Sheet 1
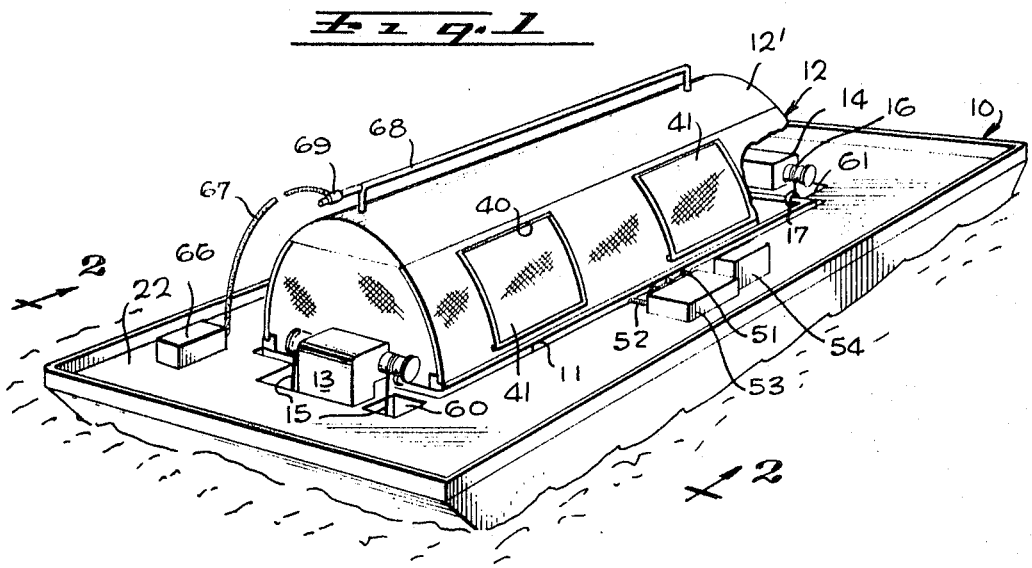
RICHARD H. SMITH
INVENTOR.
BY
Beehler & Arant
ATTORNEYS July 22, 1969 R. H. SMITH 3,456,824
DEEP SEA REFUSE DISPOSAL
Original Filed Feb. 20, 1967 2 Sheets-Sheet 2

RICHARD H. SMITH
INVENTOR.

BY Beehler & Arant
ATTORNEYS

United States Patent Office 3,456,824
Patented July 22, 1969

3,456,824
DEEP SEA REFUSE DISPOSAL
Richard H. Smith, 16831 Harkness Circle,
Huntington Beach, Calif. 92647
Original application Feb. 20, 1967, Ser. No. 617,309, now Patent No. 3,395,663, dated Aug. 6, 1968. Divided and this application Mar. 26, 1968, Ser. No. 716,084
Int. Cl. B65f 1/12
U.S. Cl. 214—152      6 Claims

ABSTRACT OF THE DISCLOSURE

The invention relates to disposal at sea of material such as mixed trash and refuse of the character commonly collected in a community as household rubbish. More particularly, the invention relates to a method for collecting mixed rubbish in one location, transporting it out to sea and submerging the rubbish to a depth sufficient to render it non-buoyant, and there dumping it so that the material will then sink to the ocean bottom.

---

This is a division of copending application Ser. No. 617,309, filed Feb. 20, 1967, now Patent No. 3,395,663.

In an embodiment of the invention which is illustrative of practice of the method, there is employed a barge equipped with a non-buoyant refuse container mounted in an open well in the barge. The container is swung on a pair of fore and aft windlasses by means of which it can be lowered into the water and subsequently raised therefrom. The container in turn is provided with a trap door at the bottom for dumping the contents and an open mesh dome over the top for confining loose, buoyant refuse material. Windlasses are employed to lower the container to a depth where the water pressure is sufficiently great to crush the cell walls of buoyant particles rendering them non-buoyant whereupon the trap door is opened by appropriate remote control or automatic means, as the case may be, permitting the entire mass of material, now in a non-buoyant condition, to be dumped downwardly into the ocean where it will fall to the bottom. The container is then raised by the windlasses into position on the barge, the trap door is closed, and the apparatus then returned for another load.

PRIOR ART PRACTICE

As refuse heretofore has been disposed at sea, a customary expedient has been to load it on barges, then tow it far enough out to sea so that after being dumped it will not be a nuisance, even though much of it may float, either temporarily or permanently, or until broken up by the waves or otherwise disintegrated. Where refuse has been of such character as not to lend itself to being dumped on the surface, containers have been used to confine the refuse until it has been submerged and falls to the ocean floor.

The foregoing method has many objections, one being that the trip out to sea to a location far enough to be out of the way is often times considerable. This is expensive, and also very troublesome in rough weather. The second above mentioned method needs especially deep water and furthermore requires loading in a special container and the attendant wasteful cost of the container which is dumped along with the refuse.

It has been demonstrated that subsantially all buoyant porous substances will become saturated and lose positive buoyancy if lowered to a certain depth in water. This depth depends upon the nature of the substance. For instance, most woods and paper will remain on the sea bottom, if lowered to a depth of 200 feet. Green or fresh vegetable matter, including ordinary household garbage, will not float below a depth of 50 feet. Closed bottles will collapse at various depths and open containers of any description will have their air pockets compressed to a point where the containers lose positive buoyancy. In fact, almost all solids except for a few certain hydrocarbons and polymers whose specific gravity is less than 1.0 will remain under water if lowered deep enough.

It is therefore among the objects of the invention to provide a new and improved method for the disposal of refuse of all kinds at sea with no evidence of the refuse being left upon the surface.

Another object of the invention is to provide a new and improved method for the direct disposal of all kinds of refuse, both buoyant and non-buoyant, at depths assuring prompt deposit on the bottom of the sea.

Still another object of the invention is to provide a new and improved method for the deposit of buoyant and non-buoyant refuse at sea at depths assuring continued submergence.

Still further among the objects of the invention is to provide a new and improved method for the deposit of all kinds of refuse on the sea bottom without need for disposable containers or accompanying non-buoyant material to hold the buoyant material submerged.

Also included among the objects of the invention is to provide a new and improved method for depositing loose refuse of all kinds at a depth assuring submergence, and subsequent retrieval of the disposal unit for reuse.

Included further among the objects of the invention is to provide a simple refuse disposal method by which refuse can be made non-buoyant by water pressure when sunk to adequate depths, the method being such that the disposal unit can be dumped either automatically or by remote control at the proper depth, after being held long enough to render all of the matrial non-buoyant, the method furthermore making certain that buoyant material which might not be rendered non-buoyant is properly confined within the unit until it is returned to the surface for reloading.

With these and other objects in view, the invention consists in the construction, arrangement, and combination of the various phases of the method, whereby the objects contemplated are attained, as hereinafter set forth, pointed out in the appended claims and illustrated in the accompanying drawings.

In the drawings:

FIGURE 1 is a perspective view of the sea going assembly showing a refuse container mounted in place upon a barge.

FIGURE 2 is a cross-sectional view taken on the line 2—2 of FIGURE 1.

Figure 3:
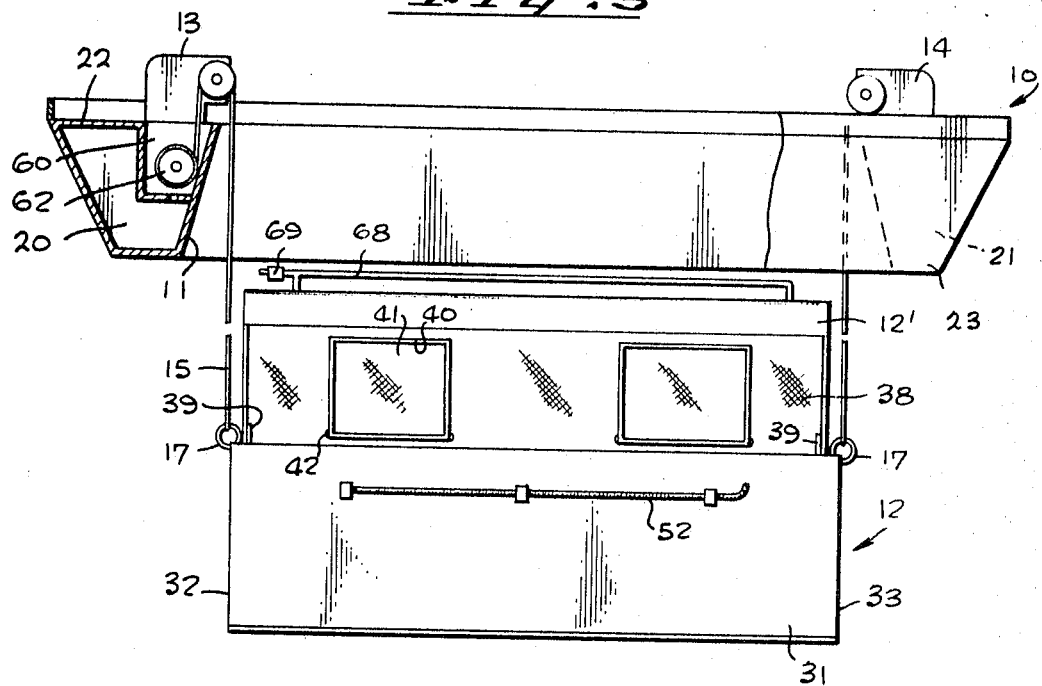
FIGURE 3 is a side elevational view partially in section showing the container in a condition of partial submergence.
Figure 4:
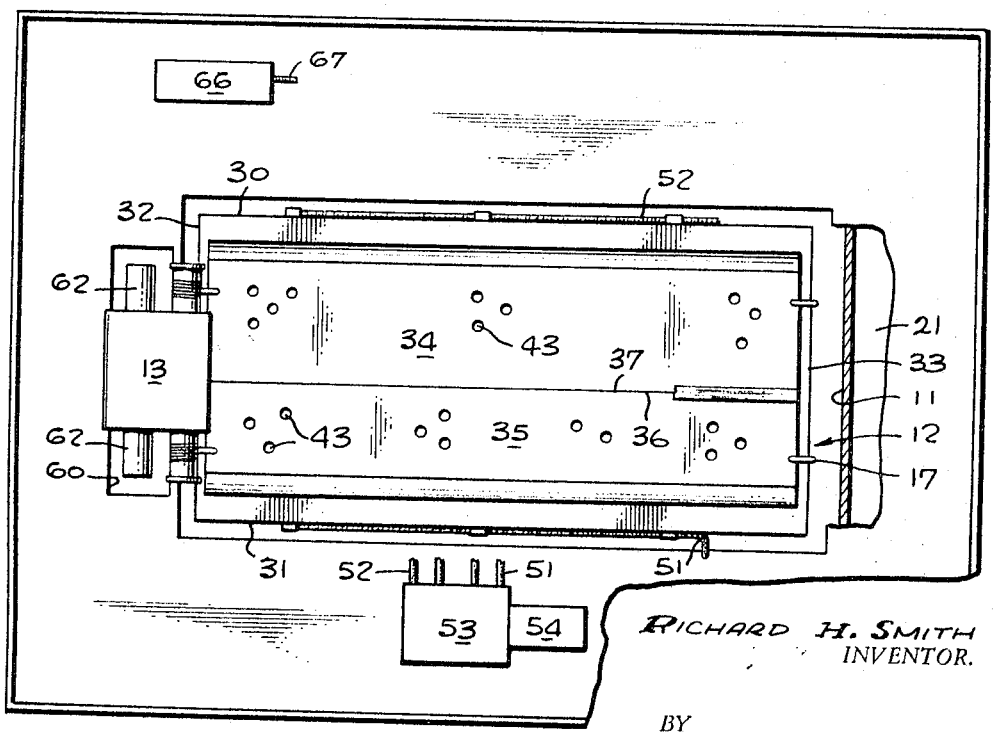
FIGURE 4 is a plan view partially in section of the barge and accompanying refuse containing unit, showing the refuse containing unit uncovered for loading.

In an embodiment of the invention chosen as a typical illustration there is shown a vessel which here takes the form of a barge indicated generally by the reference character 10 provided with an open rectangular bottomless well 11 within which is suspended a refuse containing unit or container indicated generally by the reference character 12. Power windlasses 13 and 14 are located at respective ends of the barge and appropriate cables 15 and 16 on their respective windlasses are attached to rings 17 on the ends of the container so that the container may be lowered, dumped and subsequently be raised.

Further by way of example, the vessel or barge 10 has buoyant compartments 18 and 19 joined at opposite ends by portions 20 and 21 and covered over with a common deck 22. A hull 23 supports the deck and forms the exterior walls of the compartments located therein. Presumably, the vessel could be motor powered but simple barges adapted for towing are commonly the most expedient.

The container 12 has side walls 30 and 31 and end walls 32 and 33. A substantial portion of the bottom of the container 12 is formed by two horizontal trap doors 34 and 35. These doors are hinged along the bottom edges respectively of side walls 30 and 31 and have adjacent overlapped sealing edges 36 and 37.

Extending over the top of the container 12 is a dome 38 of relatively heavy open wire mesh. The dome 38 is shown hinged at 39 so that the entire dome can be tilted free to open position if need be for loading. A hatch opening 40 is provided on the upper side of the dome 38, the hatch being normally closed by a wire mesh hatch cover 41 hinged at 42. Holes 43 admit water into the interior of the container 12.

For opening and closing the trap doors 34 and 35 there are provided hydraulic rams 45, one of which is shown in FIGURE 2 for operating the trap door 35. The door is hinged at 46 to a compartment wall 47 of the container 12. The compartment wall forms a substantially sealed compartment 48 in which the rams are located, on each side. A lever 49 connected to a piston 50 serves to operate the door. As many rams as may be required may be operatively connected to each door to operate in the manner described. Hydraulic hoses 51 and 52 are connected from the respective rams to reels (not shown) and then to a hydraulic reservoir 53 on the deck 22. A suitable pump 54 is operatively connected to the reservoir to supply power.

Wells 60 and 61 are provided for the respective cables 15 and 16, wound on take-up drums 62 so that a sufficient length of cable can be stored to accommodate lowering the container to the desired depths.

In use, the barge is first towed to an appropriate dock, together with the container, the hatch cover 41 opened and the container thereafter filled with mixed disposable refuse. After the hatch cover 41 has been closed and made fast, the barge is then floated out to sea to a location where the depth of the water is preferably in excess of 50 feet or perhaps substantially greater than that, depending upon the type of refuse to be disposed of. The barge is then moved to a suitable location and the container lowered into the sea by use of the windlasses to a selected depth. Should the refuse be all garbage, a 50 foot depth would probably be adequate for the major portion of it. If the refuse were mixed refuse, containing wood and other buoyant objects, the depth should be substantially greater and, on occasions as great as 200 feet. The precise depth is somewhat imperical depending upon the type of refuse being handled. Also how long the container should be held suspended at a particular depth depends upon the mixture of refuse in it and this should be long enough to collapse the cell walls of all of the objects and materials being disposed of.

After a sufficient lapse of time the trap doors are opened by remote control from the deck at which time, assisted by the weight of the refuse on the trap doors, they will swing down to the broken line positions 34' and 35' of FIGURE 2, thereby dumping all of the contents into the ocean. Although a manual control has been described, it will be understood that pressure sensitive controls are contemplated which will release automatically at a selected depth.

Should not all of the buoyant refuse be made non-buoyant, any refuse remaining after opening of the trap doors merely floats to the top of the dome 38 where it stays until the container is returned to the surface for reloading. This material may then be cleaned out if preferred or returned with a new load of refuse to the dumping process, when it may then be made non-buoyant.

As a safety feature the windlasses 13 and 14 may be mounted at a location above the deck 22 high enough to lift the bottom of the container above the bottom level 65 of the hull 23 so that the doors 34 and 35 will not be damaged while open, should the barge be towed to shallow water.

To assist in raising the container 12 there may be provided an imperforate central cover 12' supplied with air from a pump 66 through a flexible supply line 67 connected to a manifold 68 by a fitting 69. When the container is submerged, air can be pumped into the space beneath the cover and add to the buoyancy. If too much air is supplied it merely spills over the edges. Although buoyant pockets could be located elsewhere on the container, greatest stability is obtained by locating the pocket above the center of buoyancy in the manner shown and described.

While the invention has herein been shown and described in what is conceived to be a practical and operable method of procedure, it is recognized that departures may be made therefrom within the scope of the invention.

Having described the invention, what is claimed as new in support of Letters Patent is:

1. A method of disposal of refuse at sea by use of a container comprising placing said refuse in a container, moving said container to a location at sea, rendering said container non-buoyant, lowering said container to a selected depth at which buoyant refuse can be rendered non-buoyant, holding the container at said selected depth until buoyant portions of the refuse have been rendered non-buoyant by water pressure, then emptying said container at said depth, and subsequently retrieving said container for reuse.

2. A method according to claim 1 including preventing buoyant refuse from floating out of said container.

3. A method according to claim 1 including selecting a depth for emptying which is at least deep enough to have cell walls of all buoyant materials collapsed and hollow objects collapsed by water pressure.

4. A method according to claim 1 including flooding said container with water ballast before lowering.

5. A method according to claim 1 including pumping a quantity of air into the container while submerged to increase the buoyancy and assist in raising the container to the surface.

6. A method according to claim 5 including providing a buoyant air pocket in the container for reception of air for raising the buoyancy and providing a downwardly facing opening so that excess air pumped to the pocket will spill therefrom.

References Cited

UNITED STATES PATENTS 2,741,379 4/1956 Stryker _____ 214—152
3,352,115 11/1967 Jurisich _____ 61—46.5

GERALD M. FORLENZA, Primary Examiner

F. E. WERNER, Assistant Examiner

U.S. Cl. X.R.

214—12